United States Patent [19]

Quets

[11] Patent Number: 5,223,332

[45] Date of Patent: Jun. 29, 1993

[54] DUPLEX COATINGS FOR VARIOUS SUBSTRATES

[75] Inventor: Jean M. Quets, Indianapolis, Ind.

[73] Assignee: Praxair S.T. Technology, Inc., Danbury, Conn.

[21] Appl. No.: 531,168

[22] Filed: May 31, 1990

[51] Int. Cl.$^5$ .............................................. B32B 15/00
[52] U.S. Cl. .................................... 428/216; 428/621; 428/632; 428/665; 428/698; 428/697; 428/701; 428/702
[58] Field of Search ............... 428/698, 697, 216, 701, 428/621, 632, 665, 702

[56] References Cited

U.S. PATENT DOCUMENTS

| | | | |
|---|---|---|---|
| 2,714,563 | 8/1955 | Poorman et al. | 117/105 |
| 2,972,550 | 2/1961 | Pelton | 117/21 |
| 3,071,489 | 1/1963 | Pelton et al. | 117/22 |
| 3,150,828 | 9/1964 | Pelton et al. | 239/79 |
| 3,150,938 | 9/1964 | Pelton et al. | 29/194 |
| 3,339,933 | 9/1967 | Foster | 277/53 |
| 3,773,259 | 11/1973 | Zverev | 239/81 |
| 3,801,346 | 4/1974 | Melton, Jr. et al. | 117/16 |
| 3,884,415 | 5/1975 | Zverev et al. | 239/79 |
| 3,909,895 | 10/1975 | Abrahamson et al. | 29/95 A |
| 3,910,494 | 10/1975 | Melton, Jr. | 239/13 |
| 4,004,735 | 1/1977 | Zverev et al. | 239/79 |
| 4,172,558 | 10/1979 | Zverev et al. | 239/85 |
| 4,215,819 | 8/1980 | Garda et al. | 239/81 |
| 4,231,518 | 11/1980 | Zverev et al. | 239/81 |
| 4,258,091 | 3/1981 | Dudko et al. | 427/422 |
| 4,279,383 | 7/1981 | Zverev et al. | 239/61 |
| 4,319,715 | 3/1982 | Garda et al. | 239/81 |
| 4,359,335 | 11/1982 | Garner | 428/698 |
| 4,435,480 | 3/1984 | Mizuhara | 428/698 |
| 4,469,772 | 9/1984 | Barton et al. | 430/163 |
| 4,556,607 | 12/1985 | Sasti | 428/627 |
| 4,669,658 | 6/1987 | Nevgod et al. | 239/81 |
| 4,826,734 | 5/1989 | Jackson et al. | 428/472 |
| 4,884,820 | 12/1989 | Jackson et al. | 277/53 |
| 4,902,539 | 2/1990 | Jackson | 427/423 |

FOREIGN PATENT DOCUMENTS

61-52541 11/1981 Japan .

OTHER PUBLICATIONS

Muller et al "Applying Tungsten Carbide Cobal Coatings by High Velocity Combustion Spraying" Sulzer Technical Review Apr. 1988 pp. 4–10.

Dorfman et al "A technical assessment of high velocity oxygen–fuel versus high energy plasma tungsten carbide–cobalt coatings for wear resistance" Conference: Thermal Spraying the Welding Institute 1989, pp. 291–302.

Ramrath et al "Characterisation and wear performance at plasma sprayed WC–Co coaings" Materials Science & Technology Apr. 1989, vol. 5 pp. 382–388.

Primary Examiner—Ellis P. Robinson
Assistant Examiner—A. Turner
Attorney, Agent, or Firm—Cornelius F. O'Brien

[57] ABSTRACT

A duplex coating for substrates that comprises an undercoat of tungsten carbide-cobalt having a strain-to-fracture of greater than $4.3 \times 10^{-3}$ inch per inch and a top coat of a ceramic material such as alumina in which the ratio of the thickness of the top coat to the undercoat is from 6:1 to 1:3.

14 Claims, No Drawings

DUPLEX COATINGS FOR VARIOUS SUBSTRATES

FIELD OF THE INVENTION

The invention relates to a duplex coating that exhibits good fatigue characteristics comprising an undercoat of tungsten carbide-cobalt with a top coat of a ceramic material, such as alumina.

BACKGROUND OF THE INVENTION

A variety of rotary seals are used in gas turbine engines which are generally of the type including rotating members cooperating across a narrow gap with another member which is relatively stationary. Such seals are used, in some cases, between stationary members and a rotating shaft or drum for the purpose of maintaining different pressures in chambers on each side of the seal. For example, in one type of gas turbine engine, a plurality of rows of rotor blades extend radially outward from a rotor shaft across a flow path for the working medium gases. Collaterally, a plurality of rows of stator vanes extend radially inward across the flow path from a stator case or shroud. In some types, the stator vanes are cantilevered inward from the stator case. The vanes are positioned to direct the working gases toward or away from the adjacent rotor blades. A stator has a sealing surface circumscribing the tips of blades in each row of blades and, in the cantilever stator vane types, the rotor is provided with a sealing surface circumscribing the tips of the stator vanes in each stator vane row.

As the clearance between the tips of the blades or vanes in each row and the corresponding sealing surface is increased, substantial amounts of working medium gas escape circumferentially over the tips of the blades and/or stators, reducing the aerodynamic efficiency. Furthermore, when the clearance is increased, additional amounts of working medium gases leak axially over the tips from the downstream end to the upstream end of the blades or rotors. Therefore it is desirable to keep the clearance to a minimum. However, it is also necessary to accommodate various dimensional changes which occur during initial startup, thermal excursions, high G turns, etc. Generally, there is some wear-in of the parts under these conditions, particularly during engine startup.

It is known that the more desirable condition is for the tips or knife edges to cut grooves into the corresponding sealing surface rather than for the tips or knife edges to sustain wear. U.S. Pat. Nos. 4,238,170 and 4,239,452 provide the sealing surface of the stator or shroud with interior circumferential grooves circumscribing the tips of the blades, but this arrangement presents alignment difficulties while failing to accommodate thermally-induced axial displacement of the blades relative to the stator or shroud.

A variety of rotary seal arrangements have been disclosed in the literature in which rotating members generate, cut or abrade a path in a softer, e.g., abradable, cooperating member such as filled honeycomb, porous metal, friable ceramic or the like. In some of these arrangements, it has been found that inadequate sealing or seizing of the cooperating members can result. In other such arrangements, local "hot-spots" and burning of non-abrading members can result. Examples of seals utilizing an abradable member are disclosed in U.S. Pat. Nos. 3,068,016; 3,481,715; 3,519,282; 3,817,719; 3,843,278; 3,918,925; 3,964,877; 3,975,165; 4,377,371 and 4,540,336. The abradable seal is adapted to flake off or abrade, when there is a thermal transient or shock loading causing the blade tip to strike the seal. U.S. Pat. No. 4,377,371 points out that certain materials used as abradable seals are vulnerable to large scale spalling propagated by the presence of cracks in the seal surface and discloses the glazing of the seal surface by the use of a laser beam to produce a fine micro-crack network in the seal surface. In a paper "Development of Improved-Durability Plasma Sprayed Ceramic Coatings for Gas Turbine Engines", presented by I. E. Sumner and D. Ruckle at the AIAA/SAE/ASME 16th Joint Propulsion Conference, AIAA-80-1193, segmented laser scanned coatings were reported to perform poorly.

British Patents 853,314 and 1,008,526 disclose turbine or compressor blades formed with ribs on their tips for providing a seal with a rotor or stator shroud, the ribs or cooperating seal surface being removable when worn out. U.S. Pat. No. 4,148,494 discloses a gas turbine blade or vane having an abrasive tip comprising an electrodeposited matrix of nickel or an alloy containing nickel in which are entrapped abrasive particles, e.g., borazon particles, protruding from the tip. Abrasive tips of the type described in this patent are difficult to produce and are extremely expensive. U.S. Pat. No. 3,339,933 discloses blade teeth coated with bonded alumina which expand into cooperating honeycomb members to form a seal. U.S. Pat. No. 3,537,713 discloses a rotating sleeve having inwardly projecting teeth coated with a hard protective material, such as a molybdenum or nickel aluminide, which displaces a rub-resistant material on a stationary cooperating member to form alternate ridges and grooves.

U.S. Pat. No. 4,884,820 discloses the laser treatment of the tip of a blade that was coated with a ceramic or metallic carbide coating to form a plurality of laser-formed depressions that produce a wear-resistant, cutting surface capable of cutting into an abradable material in a rotary gas seal.

Although the above coatings provide a good wear-resistant, cutting surface for blades, the coatings sometimes do not adhere sufficiently to the blades to remain bonded to the blades when used in high temperature environments. For example, although ceramic coatings such as alumina-based coatings, provide good wear-resistant, cutting surfaces for many substrates, they do have poor bond strength to substrates such as titanium alloys. However, if the substrate, such as a titanium alloy, is roughened by grit blasting with an abrasive material, such as alumina grit, then a good bond can be obtained for the ceramic coatings. Unfortunately, the grit blast operation will generally cause a large fatigue debit to the substrate. Fatigue is the progressive phenomenon of failure that occurs in materials when they are subjected to cyclic loading at stresses having a maximum value less than the tensile strength of the materials. Fatigue can generally culminate in fracture after a sufficient number of cyclic loadings. Since fatigue causes materials to fail sooner and/or at lower loads than would be expected, its net effect has been to either shorten the useful life period of materials at the same load or reduce the allowable load for the same life period. Thus the use of grit blast is not desired since it can cause fatigue debit in the substrate.

U.S. Pat. No. 4,826,734 discloses substrates coated with tungsten carbide-cobalt coatings that have a strain-to-fracture of greater than $4.3 \times 10^{-3}$ inch per inch. However, although it will provide an adequate wear-resistant and cutting surface, the ceramic coatings generally provide a more desirable wear-resistant cutting surface for use in the tip of blades for compressors.

It is an object of the present invention to provide a duplex coating for substrates that has good fatigue characteristics while also providing a good wear-resistant cutting surface.

It is another object of the present invention to provide a duplex coating for substrates such as titanium that comprises an undercoat of tungsten carbide-cobalt and a top coat of a ceramic coating.

It is another object of the present invention to provide a duplex coating for titanium based substrates comprising an undercoat of tungsten carbide-cobalt having a strain-to-fracture greater than $4.3 \times 10^{-3}$ inch per inch and a top coat of an alumina-based coating.

The foregoing and additional objects will become more apparent from the description and disclosure hereinafter.

SUMMARY OF THE INVENTION

The invention relates to a coated article comprising a substrate, such as a titanium alloy, having an undercoat layer of tungsten carbide-cobalt bonded to the substrate and a top coat layer of a ceramic material such as an alumina-based material secured to the undercoat layer. Preferably the tungsten carbide-cobalt undercoat should have a strain-to-fracture of greater than $4.3 \times 10^{-3}$ inch per inch, Preferably greater than $5.0 \times 10^{-3}$ inch per inch and more preferably greater than $5.5 \times 10^{-3}$ inch per inch. The compressive residual stress of the tungsten carbide-cobalt undercoat should preferably be between about 30 to about 50 kilopounds per square inch (KSI). Preferably the undercoat layer should have a surface roughness of at least 100 microinch Ra so that the top coat can be sufficiently secured to the undercoat layer. Preferably, the ratio of the top coat thickness to the undercoat thickness should be from 6:1 to 1:3; and more preferably from 3:1 to 1:2.

It has been found that the novel duplex coating of this invention provides an undercoat layer that has good bond strength to the substrate and good fatigue properties while the top coat provides a surface having excellent wear-resistant, cutting characteristics. The good fatigue property of the undercoat will effectively prevent the propagation of any cracks in the top coat to the substrate when the coated substrate is put in operation, particularly an operation where it is subjected to cyclic loading. Thus the duplex coated substrate of this invention will survive longer under cyclic loading conditions than a coated substrate having only a coated layer of a ceramic material.

The undercoat layer of this invention has good fatigue properties and bond strength and can be deposited on a substrate by means such as the detonation gun process. The thickness of the undercoat layer has to be sufficient so that it can stop the propagation of any top coat cracks so that the fatigue properties of the substrate are not significantly lowered. For most applications the thickness of the top coat can be from at least 2 mils to about 20 mils, preferably at least 3 mils to about 10 mils. The surface of the undercoat should have a roughness of at least 100 microinch Ra, preferably at least 150 microinch Ra, so as to secure the top coat when deposited thereon.

The top coat of this invention should have a good wear-resistant, cutting surface and be capable of adhering to the undercoat layer so that it will not spall off when used in its intended operation. This top coat can be applied to the undercoat using conventional detonation gun processes. For most applications, the thickness of the top coat should be sufficient so that it provides a good wear-resistant, cutting surface for its intended application. Generally a thickness from at least 1 mil to about 20 mils would be suitable with a thickness from at least 2 mils to about 10 to 15 mils being preferred.

The tungsten carbide-cobalt undercoat layer should comprise from about 7 to about 25 weight percent cobalt, from about 0.5 to about 5 weight percent carbon, and from about 70 to about 92.5 weight percent tungsten. Preferably the cobalt should be from about 8 to about 18 weight percent, the carbon from about 2 to about 4 weight percent, and the tungsten from about 78 to about 90 weight percent. The most preferred coating would comprise from about 9 to about 15 weight percent cobalt, from about 2.5 to about 4.0 weight percent carbon, and from about 81 to about 88.5 weight percent tungsten.

The tungsten carbide-cobalt coating material for the invention could include a small amount of chromium, preferably from about 3 to about 6 weight percent and most preferably about 4 weight percent. The addition of chromium is to improve the corrosion characteristics of the coating.

The top coat layer of ceramic would include alumina, compositions (which shall include alloys and mixtures) of alumina with titania, chromia, and/or zirconia; compositions of chromia and alumina; compositions of zirconia mixed with silica, yttria, calcia and/or magnesia; chromium carbide; and the like. Preferably the top coat would be alumina and compositions of alumina with titania, chromia, and/or zirconia; with alumina being the most preferred.

The substrate could comprise titanium, aluminum, steel, cobalt, nickel, alloys thereof and the like. Preferably the substrate would be an alloy of titanium. When the substrate is a titanium alloy, the preferred top coating would be an alumina-based material such as alumina and the undercoat layer would be tungsten carbide-cobalt comprising from 7 to 25 weight percent cobalt, from 0.5 to 5 weight percent carbon, and from 70 to 92.5 weight percent tungsten. The thickness of the undercoat would be from 2 to 20 mils and the top coat would be from 1 to 20 mils. Generally, the ratio of the top coat layer to the undercoat layer would be from 6:1 to 3:1.

It has been found that with a titanium alloy substrate, the undercoat of tungsten carbide-cobalt will provide an excellent bond to the titanium alloy without effectively altering the fatigue properties of the titanium alloy while providing a surface having a roughness onto which the top coat can be secured. The top coat of the alumina-based material will provide an excellent wear-resistant, cutting surface that can be used in various applications under cyclic loading without failure. To further enhance the surface of the top coat, a laser treatment can be performed to provide a plurality of depressions defined by elevated land areas which can act as a collection of cutting edges. Further, the depressions defined by the land areas are relieved to enhance the cutting ability by providing space for receiving fine cutting debris when the duplex coated substrate is used as a blade in a compressor. Upon cooling, the tip of the blade would retract and the debris would be released from the surface.

The preferred method for depositing the undercoat would be to flame plate with a detonation gun comprising the steps of introducing desired fuel and oxidant gases into the detonation gun to form a detonatable mixture, introducing a comminuted coating material into said detonatable mixture within the gun, and detonating the fuel-oxidant mixture to impinge the coating material onto a substrate to be coated. Preferably the fuel-oxidant mixture would comprise an oxidant and a fuel mixture of at least two combustible gases selected from the group of saturated and unsaturated hydrocarbons. Preferably the oxidant employed would generally be oxygen and the combustible fuel mixture would be acetylene gas and propylene gas.

The powders of the coating material for use in obtaining the undercoat layer are preferably powders made by the cast and crushed process. In this process, the constituents of the powders are melted and cast into a shell-shaped ingot. Subsequently, this ingot is crushed to obtain the desired particle size distribution. The resulting powder particles contain angular carbides of varying sizes. Varying amounts of metallic phase are associated with each particle. This morphology causes the individual particles to have non-uniform melting characteristics. In fact, under some coating conditions some of the particles containing some of the larger angular carbides may not melt at all. The preferred powder produces a coating having a polished metallographic appearance consisting of approximately 2-20% angular tungsten carbide particles, generally sized from 1 to 25 microns and distributed in a matrix consisting of $W_2C$, mixed carbides such as $Co_3W_3C$, and Co phases.

The powders of the coating material for use in obtaining the top coat are preferably powders made by calcining metal salts. The resulting powder particle should generally be sized in the range of 1 to 45 microns.

In the testing of coated samples, various data were observed and some of the data were obtained using the following test procedures.

Strain-To-Fracture Test

The strain-to-fracture of the coatings in the examples was determined by using a four point bend test. Specifically, a beam of rectangular cross-section made of 4140 steel hardened to 40-45 Hardness Rockwell C scale (HRC) is coated on one side with the material to be tested. The typical substrate dimensions are 0.50 inch wide, 0.25 inch thick and 10 inches long. The coating area is 0.50 inch by about 7 inches, and is centered along the 10 inch length of the substrate. The coating thickness is typically 0.015 inch, although the applicability of the test is not affected by the coating thickness in the range between 0.010 to 0.020 inch. An acoustic transducer is attached to the sample, using a couplant such as Dow Corning high vacuum grease, and masking tape. The acoustic transducer is piezoelectric, and has a narrow response band located approximately between 90 and 120 $KH_z$. The transducer is attached to a preamplifier with a fixed gain of 40 dB which passes the signal to an amplifier with its gain set at 30 dB. Thus the total system gain is 70 dB. The amplifier is attached to a counter which counts the number of times the signal exceeds a threshold value of 1 millivolt, and outputs a voltage proportional to the total counts. In addition, a signal proportional to the peak amplitude of an event is also recorded.

The coated beam is placed in a bending fixture. The bending fixture is designed to load the beam in four point bending with the coating in tension. The outer loading points are 8 inches apart on one side of the beam, while the middle points of loading are 2⅜ inches apart on the opposite side of the substrate. This test geometry places the middle 2⅜ inches of the coated beam in a uniform stress state. A universal test machine is used to displace the two sets of loading points relative to each other, resulting in bending of the test sample at the center. The sample is bent so that the coating is convex, i.e., the coating is placed in tension. During bending the deformation of the sample is monitored by either a load cell attached to the universal test machine or a strain gage attached to the sample. If the load is measured, engineering beam theory is used to calculate the strain in the coating. During bending, the acoustic counts and peak amplitude are also recorded. The data are simultaneously collected with a three pen chart recorder and a computer. When cracking of the coating occurs, it is accompanied by acoustic emission. The signature of acoustic emission associated with through-thickness cracking includes about $10^4$ counts per event and a peak amplitude of 100 dB relative to 1 millivolt at the transducer. The strain present when cracking begins is recorded as the strain-to-fracture of the coating.

Residual Stress Test

The residual stress of the coatings in the examples was determined using a blind hole test. The specific procedure is a modified version of ASTM Standard E-387. Specifically, a strain gage rosette is glued onto the sample to be tested. The rosette used is sold by Texas Measurements, College Station, Tex., and is gage FRS-2. This device consists of three gages oriented at 0, 90 and 225 degrees to each other and mounted on a foil backing. The centerline diameter of the gages is 5.12 mm (0.202 in), the gage length is 1.5 mm (0.059 in), and the gage width is 1.4 mm (0.055 in). The procedure to attach the rosette to the sample is as recommended in Bulletin B-127-9 published by Measurements Group Inc., Raleigh, N.C. A metal mask is glued onto the strain gage to help position the hole at the time of drilling and to protect the strain gage during the drilling of the hole. The mask has an annular geometry, having an outer diameter equal to 0.382 inch, an inner diameter equal to 0.160 inch, and a thickness of 0.0485 inch. This mask is positioned to be concentric with the strain gages, using a microscope at 6×. When it is centered, a drop of glue is applied at the edges and allowed to dry, fixing the mask in place. The three gages are hooked up to three identical signal conditioners, which provide a reading in units of strain. Prior to starting a test, all three units are adjusted to give zero readings.

The test equipment includes a rotating grit blast nozzle mounted on a plate which can travel vertically and in one direction horizontally. The grit blast nozzle is made by S. S. White of Piscataway, N.J., and has an inner diameter of 0.026 inch and an outer diameter of 0.076 inch. The nozzle is offset from its center of rotation, so the result is a trepanned hole with a diameter between 0.096 and 0.1002 inch. The sample to be drilled is placed in the cabinet, and the strain gage is centered under the rotating nozzle. Positioning of the part is accomplished by rotating the nozzle with no flow of either abrasive media or air, and manually adjusting the location of the sample so that the nozzle rotation is concentric with the mask. The standoff between the nozzle and the part is set at 0.020 inch. The location of the plate is marked by stops. The abrasive used to drill the holes is 27 microns of alumina, carried in air at 60 psi. The erodent or abrasive media is used at a rate of 25 grams per minute (gpm). The abrasive is dispensed by a conventional powder dispenser. The hole is drilled for 30 seconds, at which time the flow of the abrasive and air is stopped. The nozzle is moved away from the part. The positions at the top of the strain gage and the bottom of the hole are measured with a portable focusing microscope and the difference recorded. The depth of hole is the difference minus the thickness of the strain gage. The strain released around the hole is indicated by the signal conditioners, and these values are also recorded. The sample is not moved during the recording of data, so the nozzle can be brought back to its initial starting point and the test continued.

The test is repeated until the hole depth is greater than the thickness of the coating, at which time the test is terminated. The strain released in an incremental layer at a given hole depth is related to the stress in that layer empirically, using data from a calibration sample of mild steel loaded to a known stress state. From this data the residual stress is determined.

The correlation between the strain-to-fracture and the residual stress of a coating is as follows. When the material is under a combined set of loads, the stresses and strains from each of the loading conditions may be calculated, and the total stress and strain map may be determined by superimposing the stresses resulting from each load. Applying this fact to coatings, the residual stress in the coating must be added to the stress applied during the four point bend test to determine the actual stress state of the coating at the time that fracture occurs. The four point bend test is run such that the coating is placed in tension. Thus, using the fact that stress and strain are related by a constant, the total stress in a coating at failure is actually given by $$\sigma_t = E\epsilon_f + \sigma_r \quad \text{(eq. 1)}$$

$\sigma_t$ = applied stress
E = coating elastic modulus
$\epsilon_f$ = strain-to-fracture from four point bend test
$\sigma_r$ = coating residual stress, measured from blind hole test (by convention compressive stresses are negative values)

In general, the coating will crack at a constant value of stress, regardless of whether that stress came about as a result of residual or applied stress or a combination of the two. A coating with a given compressive residual stress must be subjected to an equal amount of applied tensile stress before the coating is placed in tension. Rearranging eq. 1 to express the strain-to-fracture as a function of residual stress, it is apparent that an increased compressive stress in a coating will result in an increased strain-to-fracture of the coating.

$$\epsilon_f = \frac{(\sigma_t - \sigma_r)}{E} \quad \text{(eq. 2)}$$

Thus, the stress or strain which can be applied before the coating fractures is affected by the amount of residual stress or strain present in the coating.

Additional information on the blind hole test for measuring residual stress can be found in the publication titled Residual Stress in Design, Process and Materials Selection, published by ASM International, Metals Park, Ohio. This publication contains an article given by L. C. Cox at the ASM Conference of the same title on Apr. 27–29, 1987 in Cincinnati, Ohio. The disclosure of this article is incorporated herein as if the entire article was presented in this specification.

Bond Strength Test

The bond strength of the coating to the substrate was determined using the method disclosed in ASTM 633 except that the coating layer was a thinner layer. Specifically, the coating to be tested was deposited on a set of six cylindrical bond test specimens, each measuring 1 inch in diameter. The surface of the coated layer was ground with a diamond wheel to provide a smooth surface normal to the axis of the cylinder. The cylindrical specimens were then each secured to a matching uncoated cylindrical specimen using an epoxy adhesive, sold under the Trade Mark "SCOTCH-WELD EPOXY ADHESIVES 2214 NON-METALLIC" by the 3M Corp. This epoxy adhesive is composed of the following:

| Ingredients | Percent |
| --- | --- |
| epoxy resin blend | 70.0–80.0 |
| aliphatic glycidyl ether | 1.0–10.0 |
| nitrile latex | 1.0–10.0 |
| dicyandiamide | 1.0–10.0 |
| 3-p-chlorophenyl)-1,1-dimethyl urea | 1.0–10.0 |
| amorphous silicon dioxide | 1.0–10.0 |
| water | 1.0–10.0 |

After curing the epoxy, the cylindrical specimens were pulled apart to rupture and the load at rupture was observed. After this test each coated cylindrical specimen was inspected to determine whether the rupture occurred in the coated bonded area or the epoxy bonded area.

Fatigue Test

The fatigue specimens were machined into cylindrical test bars measuring 3.5 inches in length with segment portions at each end measuring 0.8 inch in length and having a 0.6 inch diameter. The inner portion of each end segment was inwardly tapered to produce a central segment measuring 0.75 inch in length with a 0.25 inch diameter. The central segment is referred to as the gage section of the test bar. A coating is applied to the gage section and the onwardly tapered segments using a detonation gun. The coating is tested in its "as-coated" state, preserving the natural surface roughness of the coating. The fatigue test is conducted as an axial tension-tension test with a minimum to maximum stress ratio R of 0.1. The test is conducted in air at ambient temperature on a simple load-controlled, axial fatigue testing machine at 30 Hz. For all specimens, the maximum stress was derived as the maximum load over the gage cross-section of the substrate material. Each test was run until the specimen fractured in the gage section (gage section failure=GSF) or until ten million cycles were reached (run out=RO).

Some examples are provided below to illustrate the present invention. In these examples, coatings were made using the powder compositions shown in Table 1.

TABLE 1

| Sample Powder | Coating Material Powders | | | | | | | |
|---|---|---|---|---|---|---|---|---|
| | Composition - wt % | | | | | | Powder Size | |
| | Al₂O₃ | Co | C | Fe | Other | W | % thru Mesh* | Max. % of Min. Size |
| A Cast & Crushed | — | 9.0 to 10.0 | 4.3 to 4.8 | 1.5 max. | 0.3 max. | Bal. | 95% thru 325 | 10% less than 5 microns |
| B | 99.1% min. | — | — | — | — | — | 99% thru 325 | — |

*U.S. Standard Mesh Size.

EXAMPLE I

The gaseous fuel-oxidant mixtures of the compositions shown in Table 2 were each introduced to a detonation gun to form a detonatable mixture having an oxygen to carbon atomic ratio as shown in Table 2. The sample coating powder as shown in Table 2 was also fed into the detonation gun. The flow rate of each gaseous fuel-oxidant mixture, the feed rate of each coating powder, the gaseous fuel-mixture in volume percent, and the atomic ratio of oxygen to carbon for each coating example are also shown in Table 2. The coating sample powder was fed into the detonation gun at the same time as the gaseous fuel-oxidant mixture. The detonation gun was fired at a rate of about 8 times per second and the coating powder in the detonation gun was impinged onto a variety of steel and titanium substrates to form a dense, adherent coating of shaped microscopic leaves interlocking and overlapping with each other.

The percent by weight of the cobalt and carbon in the coated layer of Sample Coatings 1 and 2 were determined along with the hardness of the coating. The hardnesses of the Sample Coatings 1 thru 3 in Table 2 were measured using a Rockwell superficial hardness tester and Rockwell hardness numbers were converted into Vickers hardness numbers. The Rockwell superficial hardness method employed is per ASTM standard method E-18. The hardness is measured on a smooth and flat surface of the coating deposited on a hardened steel substrate. The Rockwell hardness number was converted to a Vickers hardness number by the following formula:

$$HV_{0.3} = -1774 + 34.433\, HR45N$$

where $HV_{0.3}$ designates a Vickers hardness obtained with 0.3 kgf load and $HR45N$ designates the Rockwell superficial hardness obtained on the N scale with a diamond penetrator and a 45 kgf load.

The strain-to-fracture values and the residual stress values were obtained as described above and the data obtained are shown in Table 2.

EXAMPLE II

One inch diameter test bars of Ti-6Al-4V were coated at their end face using the same method and powder composition as was used for Sample Coating 3 of Example I. Each cylindrical bar was then secured to a mating bar along its longitudinal axis using SCOTCH-WELD epoxy adhesive. After the epoxy was cured, the two cylindrical bars were pulled apart to rupture and the load at rupture was recorded for each sample. The test bars were then examined to determine if the rupture occurred at the coated bonded area (referred to as coating to substrate bond—CSD) or at the epoxy bonded area (Epoxy). The thickness of the coating, the bond strength to rupture and the type of rupture observed are shown in Table 3.

TABLE 3

| Bond Strength of Power B Coated Substrates | | | |
|---|---|---|---|
| Sample Specimen | Coating Thichness (inch) | Bond Strength (PSI) | Rupture Type |
| 1 | 0.0067 | 4,762 | CSD |
| 2 | 0.0066 | 2,979 | CSD |
| 3 | 0.0069 | 3,731 | CSD |
| 4 | 0.0073 | 7,334 | CSD |
| 5 | 0.0065 | 8,518 | CSD |
| 6 | 0.0067 | 5,373 | CSD |
| | | Avg. 5,450 | |

EXAMPLE III

One inch diameter test bars of Ti-6Al-4V were coated at their end face using the same method and powder composition as was used for Sample Coating 2 of Example I. In addition, a top coat was applied using the same method and powder composition as was used for Sample Coating 3 of Example I. Each duplex coated cylindrical bar was then secured to a mating bar along its longitudinal axis using SCOTCH-WELD epoxy adhesive. After the epoxy was cured, the two cylindrical bars were pulled apart to rupture and the load at rupture was recorded for each sample. The test bars were examined to determine if the rupture occurred at the coated bonded area (CSD) or at the epoxy bonded area (Ep-

TABLE 2

| | | | | D-Gun Parameters and Properties of Coated Samples | | | | | | | | |
|---|---|---|---|---|---|---|---|---|---|---|---|---|
| Sample Coating | Powder | Powder Feed Rate (gpm) | Gaseous Flow Rate (ft³/min) | Gaseous Fuel Mixture (vol %) | | | | O₂ to C Atomic Ratio | Chemistry (wt %) | Vickers Hardness (kg/mm²) | Strain-to Fracture (mils/in) | Residual Stress (KSI) |
| | | | | N₂ | C₃H₆ | C₂H₂ | O₂ | | | | | |
| 1[1] | A | 53.3 | 13.5 | — | 25.6 | 16.6 | 57.8 | 1.05 | 14.1% Co, 2.8% C | 1210[3] | 5.9 | −35 |
| 2[1] | A | 53.3 | 11.0 | 40 | — | 30.3 | 29.7 | 0.98 | 13.2% Co, 3.5% C | 1080[3] | 2.9 | −2 |
| 3[2] | B | 17.8 | 11.0 | — | — | 41.6 | 58.4 | 1.4 | 99% Al₂O₃ | 1103[3] | 7.1 | 1 |

[1] Undercoat.
[2] Topcoat.
[3] Measured as Rockwell superficial hardness and converted to Vickers hardness.

oxy). The thickness of each coated layer, the bond strength to rupture and the type of rupture observed are shown in Table 4. There was some minor edge chipping of the coating. The average bond strength of the duplex coating of this invention was far superior to the average bond strength of the samples shown in Example II.

TABLE 4

Bond Strength of Duplex Coated Substrate

| Sample Specimen | Undercoat Coating Thichness (inch) | Top Coat Coating Thichness (inch) | Bond Strength (PSI) | Rupture Type |
|---|---|---|---|---|
| 1 | 0.0005 | .0066 | 10,963 | Epoxy + edge chipping |
| 2 | 0.0005 | .0068 | 11,485 | Epoxy |
| 3 | 0.0005 | .0064 | 12,274 | Epoxy + edge chipping |
| 4 | 0.0005 | .0065 | 10,759 | Epoxy + edge chipping |
| 5 | 0.0005 | .0066 | 13,178 | Epoxy + edge chipping |
| | | | Avg. 11,732 | |

EXAMPLE IV

One inch diameter test bars of Ti-6Al-4V were coated at their end face using the same method and Powder composition as was used for Sample Coating 1 of Example I. In addition, a top coat was supplied using the same method and powder composition as was used for Sample Coating 3 of Example I. Each duplex coated cylindrical bar was then secured to a mating bar along its longitudinal axis using SCOTCH-WELD epoxy adhesive. After the epoxy was cured, the two cylindrical bars were pulled apart to rupture and the load at rupture was recorded for each sample. The test bars were examined to determine if the rupture occurred at the coated bonded area (CSD) or at the epoxy bonded area (Epoxy). The thickness of each coated layer, the bond strength to rupture and the type of rupture observed are shown in Table 5. In some instances, there was some minor edge chipping of the coating. The average bond strength of the duplex coating of this invention was far superior to the average bond strength of the samples shown in Example II.

TABLE 5

Bond Strength of Duplex Coated Substrate

| Sample Specimen | Undercoat Coating Thichness (inch) | Top Coat Coating Thichness (inch) | Bond Strength (PSI) | Rupture Type |
|---|---|---|---|---|
| 1 | 0.0005 | .0094 | 11,867 | Epoxy |
| 2 | 0.0005 | .0093 | 11,612 | Epoxy + edge chipping |
| 3 | 0.0005 | .0088 | 10,797 | Epoxy |
| 4 | 0.0005 | .0090 | 11,561 | Epoxy + edge chipping |
| 5 | 0.0005 | .0105 | 9,140 | Epoxy |
| 6 | 0.0005 | .0088 | 10,975 | Epoxy |
| | | | Avg. 11,510 | |

EXAMPLE V

Fatigue test bars made of Ti-6-4 alloy made as described above were coated on their central or gage portions with the coated composition of Sample Coating 1, 2 or 3 of Example I using the process and gaseous fuel mixture as shown in Table 2 for Sample Coating 1, 2 or 3, respectively. Additional fatigue test bars were coated on their gage portions with an undercoat of the coated composition of Sample Coating 1 or 2 over which was deposited the coated composition of Sample Coating 3 of Example I. These test bars were coated with different thicknesses of the coated composition of Sample Coating 1, 2 or 3 of Example I, as shown in Table 6. Prior to coating, the test bars were not grit blasted, with the exception of the test bars coated only with the Sample Coating 3 of Table 2 of Example I, which were grit blasted with 60 mesh angular particles of alumina to promote a good bond strength between the Sample Coating 3 and the test bars. Together with some uncoated fatigue bars, the coated fatigue bars were subjected to the fatigue test as described above. Table 6 shows the maximum stress each individual bar was subjected to and the number of cycles it sustained before the bar broke in fatigue in the gage portion or if it did not break after $10^7$ cycles, then the test was interrupted and described as a run-out.

The data from Table 3 of Example 11 shows that test bars coated with $Al_2O_3$ all ruptured at the coated bonded area while the data from Table 4 of Example III shows that the test bars coated with a duplex coating in accordance with this invention ruptured at the epoxy bonded area and not the coated bonded area. These tests demonstrate that the $Al_2O_3$ coating did not adhere effectively to the substrate when it was used as a single coating but did adhere effectively to a tungsten carbide-cobalt undercoat as shown in Example III. Thus, although $Al_2O_3$ coatings provide a good wear-resistant cutting surface for blades, the coatings sometimes do not adhere sufficiently to the blades to remain bonded to the blades when used in their intended applications.

However, if the substrate, such as a blade is first coated with a tungsten carbide-cobalt undercoat and then coated with a $Al_2O_3$ coating, the $Al_2O_3$ coating will adhere to and provide a good bond with the undercoat layer. This can be accomplished without the need for grit blasting the substrate which could cause a large fatigue debit to the substrate.

The data in Table 2 shows that a coating applied using the combination of two combustible gases gave better strain-to-fracture and residual stress than a coating which was applied using a conventional detonation gun process using only one combustible gas. In Table 6, Test Bar 16 was made using a conventional detonation process of only one combustible gas and survived $1.86 \times 10^5$ cycles at a stress of 50 KSI. The same coating composition and thickness of the layers of the duplex coating were also applied using a detonation gun process using two combustible gases (Test Bar 18) and this Test Bar 18 survived $1.4166 \times 10^7$ cycles at a stress of 50 KSI. Thus the process used to deposit the undercoat on the substrate should be selected to insure that the undercoat of tungsten carbide-cobalt has a strain-to-fracture of greater than $4.3 \times 10^{-3}$ inch per inch.

It is to be understood that although the present invention has been described with reference to particular details thereof, it is not intended that these details shall be construed as limiting the scope of this invention.

TABLE 6

FATIGUE TEST AT MAXIMUM STRESS LEVELS

| Test Bar | Max. Stress (KSI) | Coating Sample | Coating Thickness (mils) | Cycles | Fatigue Results |
|---|---|---|---|---|---|
| 1 | 80 | 2 | 10.0 | $2.2 \times 10^4$ | GSF |
| *2 | 80 | Duplex 1 3 | 4.8 1.5 | $2.9 \times 10^4$ | GSF |
| 3 | 80 | Duplex 1 | 1.9 | $3.7 \times 10^4$ | GSF |

TABLE 6-continued

FATIGUE TEST AT MAXIMUM STRESS LEVELS

| Test Bar | Max. Stress (KSI) | Coating Sample | Coating Thickness (mils) | Cycles | Fatigue Results |
|---|---|---|---|---|---|
|  |  | 3 | 5.6 |  |  |
| 4 | 80 | Duples 1 | 1.0 | 5.2 × 10⁴ | GSF |
|  |  | 3 | 6.0 |  |  |
| 5 | 80 | 1 | 9.1 | 1.2135 × 10⁷ | RO |
| 6 | 80 | 1 | 9.3 | 1.009 × 10⁷ | RO |
| 7 | 80 | Duplex 1 | 3.8 | 1.0229 × 10⁷ | RO |
|  |  | 3 | 3.9 |  |  |
| 8 | 70 | Duplex 2 | 1.0 | 5.0 × 10⁴ | GSF |
|  |  | 3 | 6.0 |  |  |
| 9 | 70 | Duplex 1 | 1.9 | 7.6 × 10⁴ | GSF |
|  |  | 3 | 6.6 |  |  |
| 10 | 70 | 3 | 6.5 | 1.31 × 10⁵ | GSF |
| 11 | 70 | Duplex 1 | 5.3 | 1.0043 × 10⁷ | RO |
|  |  | 3 | 2.0 |  |  |
| 12 | 60 | 2 | 9.5 | 4.9 × 10⁴ | GSF |
| 13 | 60 | Duplex 1 | 1.0 | 1.08 × 10⁵ | GSF |
|  |  | 3 | 6.0 |  |  |
| 14 | 60 | 1 | 9.1 | 1.0162 × 10⁷ | RO |
| 15 | 60 | 3 | 6.8 | 1.0099 × 10⁷ | RO |
| 16 | 50 | Duplex 2 | 1.0 | 1.86 × 10⁵ | GSF |
|  |  | 3 | 6.0 |  |  |
| 17 | 50 | 3 | 6.8 | 3.063 × 10⁶ | GSF |
| 18 | 50 | Duplex 1 | 1.0 | 1.4166 × 10⁷ | RO |
|  |  | 3 | 6.0 |  |  |
| 19 | 40 | 2 | 8.4 | 1.56 × 10⁵ | GSF |
| 20 | 40 | 2 | 9.5 | 2.67 × 10⁵ | GSF |
| 21 | 40 | Duplex 2 | 1.0 | 4.18 × 10⁵ | GSF |
|  |  | 3 | 5.8 | 4.18 × 10⁵ |  |
| 22 | 40 | Duplex 1 | 1.0 | 1.0002 × 10⁷ | RO |
|  |  | 3 | 6.0 |  |  |

*This Test Bar broke in an area that was not coated.

What is claimed:

1. A duplex coating for use on substrates comprising an under coat of tungsten carbide-cobalt with a strain-to-fracture of greater than $4.3 \times 10^{-3}$ inch per inch and a top coat of a ceramic material in which the thickness ratio of the top coat to the undercoat is from 6:1 to 1:3; wherein the tungsten carbide-cobalt under coat has a cobalt content of from about 7 to about 25 weight percent, a carbon content from about 0.5 to about 5 weight percent and tungsten content of from about 70 to 92.5 weight percent; a roughness of at least 100 microinch Ra and a thickness of at least 2 mil and the top coat is at least one mil thick.

2. The duplex coating of claim 1 wherein the thickness ratio of the top coat to the undercoat is from 3:1 to 1:2.

3. The duplex coating of claim 1 wherein the tungsten carbide-cobalt undercoat has a strain to fracture of greater than $5.0 \times 10^{-3}$ inch per inch.

4. The duplex coating of claim 1 wherein the ceramic material is an alumina based material.

5. The duplex coating of claim 1 wherein the ceramic material is selected from the group comprising alumina, composition of alumina with at least one member selected from the group consisting of titanium, chromia and zirconia; compositions of chromia and alumina; composition of zirconia with at least one member selected from the group consisting of magnesia, silica, yttria, and calcia; and chromium carbide.

6. The duplex coating of claim 1 wherein said undercoat contains up to 6 weight percent chromium.

7. The duplex coating of claim 1 wherein said undercoat contains from about 3 to about 5 weight percent chromium.

8. The duplex coating of claim 1, 6 or 7 wherein the cobalt content is from about 8 to about 18 weight percent, the carbon content is from about 2.0 to about 4.0 weight percent and the tungsten content is from about 78 to about 90 weight percent.

9. The duplex coating of claim 1 wherein said undercoat is from 2 mils to 20 mils inch thick and said top coat is from 1 mil to 20 mils thick.

10. The duplex coating of claim 1 on a substrate, wherein said substrate is selected from the group comprising titanium, steel, aluminum, cobalt, nickel and alloys thereof.

11. The duplex coating of claim 10 wherein the substrate is a blade.

12. The duplex coating of claim 11 wherein the blade is coated at its tip.

13. The duplex coating of claim 11 wherein the blade is a titanium blade and the top coat is an alumina based material.

14. The duplex coating of claim 10 wherein said undercoat contains up to 6 weight percent chromium.

* * * * *